Patented Aug. 29, 1950

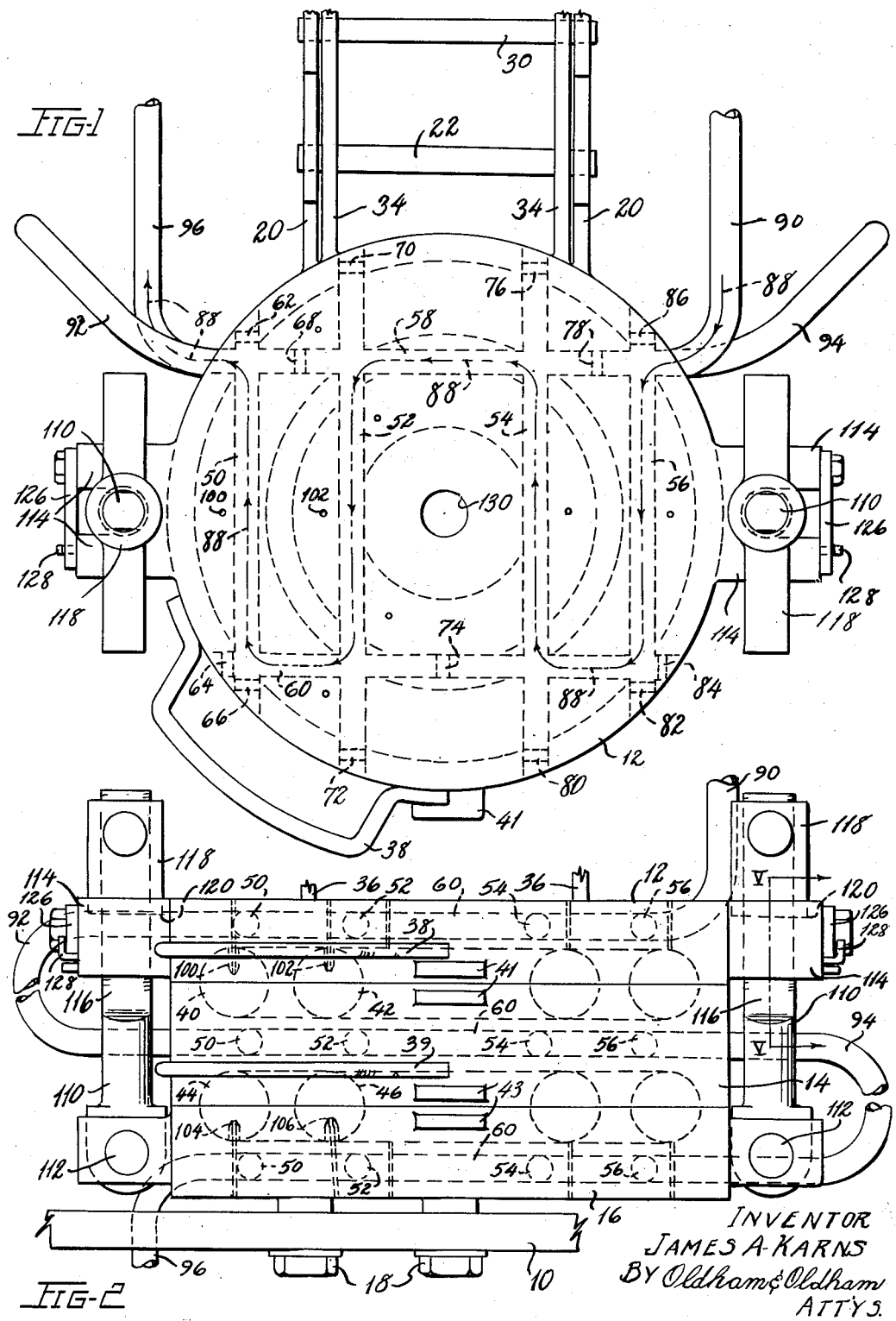

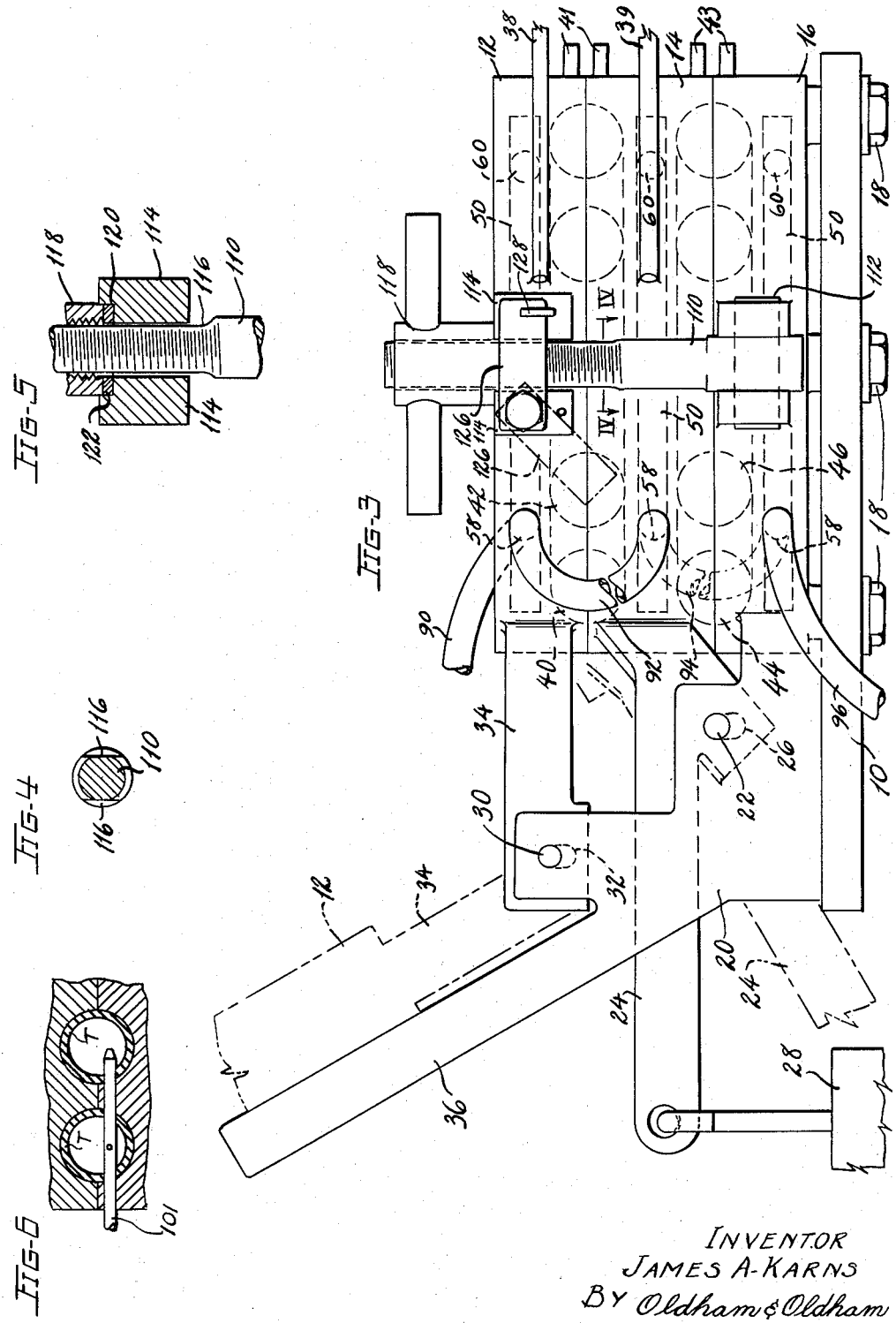

2,520,550

UNITED STATES PATENT OFFICE 2,520,550

MULTIPLE CAVITY MOLD FOR SINGLE TUBE TIRES AND THE LIKE

James A. Karns, Akron, Ohio

Application November 30, 1946, Serial No. 713,328

1 Claim. (Cl. 18—43)

This invention relates to molds for tires and the like, and, more particularly, is concerned with multiple cavity molds for vulcanizing single tube tires of the type used on children's velocipedes, wheelbarrows, light industrial trucks and the like.

Heretofore, it has been the conventional practice to vulcanize single tube tires in two part molds, a plurality of the molds being piled one on top of the other, and with the pile of molds being positioned in a pot heater or steam jacket, with hydraulic ram means for pressing the pile of molds tightly together, and with steam being circulated through the pot or jacket containing the molds to effect vulcanization of the tires in the mold. This process is relatively slow, requires very considerable space, and relatively expensive equipment, and ties up molding and heating equipment. Watch case type molds have been suggested and used heretofore in conjunction with automobile, truck, or other pneumatic tires, but equipment of this type is quite expensive, and very space consuming.

It is the general object of my invention to avoid and overcome the foregoing and other difficulties of and objections to prior known apparatus and to provide a relatively inexpensive and compact molding apparatus for rapidly and efficiently vulcanizing a considerable number of single tube tires simultaneously.

Another object of my invention is the provision of apparatus of the character described wherein a plurality of complementary cavity mold parts are permanently mounted for movement to and from stacked position, with each mold part being steam jacketed and connected by a flexible steam conduit to the adjacent mold part whereby steam can be continuously passed through the mold parts with the mold parts in either open or molding position.

Another object of my invention is to provide a mold of the character described in which the plurality of mold parts when moved to the open position are supported in spaced relation to each other so as to permit the removal or entry of a tire from each of the molds.

Another object of my invention is the provision of a multi-part mold having more than two tire molding cavities therein, with means for quickly but positively and releasably locking the mold parts together.

Another object of my invention is to provide single tube tire molds having built in piercing needles.

Another object of the invention is to provide a tire mold having more than two mold parts, but with at least one of the mold parts being movably mounted and counter-weighted for movement.

The foregoing objects of my invention, and other objects which will become apparent as the description proceeds, are achieved by the provision of a mold for single tube tires or the like, including a stack of more than two registering but separable mold parts, each adjacent pair of mold parts having complementary cavities, each mold part being steam jacketed and flexible steam conduits connecting the steam jackets of each mold part to the next adjacent mold part so as to provide a path for the flow of steam heat through the mold parts whether they are open or closed.

The improved mold includes means pivotally supporting all but the bottom mold part for movement to and from closed position, counterweight means on at least one mold part, the mold parts when in open position being held in spaced relation to each other to allow entry or removal of tires from the mold parts. Quickly releasable hinged screw clamps are used for holding the mold parts tightly together, and releasable lock means are normally incorporated with the mold for holding the screw clamp in clamping position.

For a better understanding of the invention reference should be had to the accompanying drawings, wherein:

Fig. 1 is a plan view of a typical mold incorporating the features of the invention;

Fig. 2 is a front elevation of the mold shown in Fig. 1;

Fig. 3 is a side elevation of the mold illustrated in Figs. 1 and 2;

Fig. 4 is a horizontal cross-sectional view taken substantially on line IV—IV of Fig. 3;

Fig. 5 is a vertical cross-sectional view taken substantially on line V—V of Fig. 2; and Fig. 6 is a fragmentary vertical sectional view illustrating a removable piercing needle for applying air under pressure to the interior of the tires being vulcanized.

In the drawings, the numeral 10 indicates a bed or table on which the mold is mounted. The mold comprises a plurality of more than two, but conveniently three mold parts 12, 14 and 16. The bottom mold part 16 is ordinarily secured to the base 10 in any permanent manner, for example, by bolts 18. The several mold parts may be provided with any desired registering means, such as dowel pins, but preferably registration or alignment of the mold parts is achieved in a manner hereinafter described.

The mold parts 12, 14 and 16 are mounted for movement to and from closed or operating relation with each other, and this is ordinarily achieved by the provision of laterally-spaced hinge brackets 20 which are secured to the bottom mold part 16, and which rest on the base 10. The hinge brackets 20, as best seen in Fig. 1, are laterally spaced and are connected by a hinge pin 22. Spaced arms 24 are secured to the intermediate mold part 14, and the arms 24 are provided with vertically-oblong holes 26 which receive the pin 22. Secured to the ends of the arms 24 are counter-weights 28 which substantially counter-balance the weight of the mold part 14. The arms 24 are moved from the full line position shown in Fig. 3 to the dotted line position when the mold is opened. The oblong holes 26 in the arms 24 permits the proper registration of the mold part 14 with respect to the base mold part 16.

The hinge brackets 20 support a second pin 30 which is received in vertically-oblong holes 32 in spaced arms 34 secured to the top mold part 12. The top mold part 12 is adapted to be moved from the full line position shown in Fig. 3 to the dotted line position shown when the mold is opened, and extensions 36 of the hinge brackets 20 support the top mold part 12 when in the open position. A handle 38 on the top mold part and a handle 39 on the intermediate mold part serve to permit the operator to move the mold parts from open to closed position, and lugs 41 and 43 on the complemental mold parts are generally provided in case it should become necessary to break the mold part by means of a crowbar if they should stick. Ordinarily, the operator can rather easily break the mold parts apart by grasping the handles 38 and 39 in turn and lifting the mold parts to their open position.

It will be recognized that when the mold parts are moved to their open position by the hinges described, tires can be removed from the mold parts and unvulcanized tires placed in the cavities thereof without the operator having to use a hand to hold or support any mold part.

Complementary molding cavities are provided between adjacent surfaces of the several mold parts, the molding cavities being indicated by the numerals 40, 42, 44, and 46. It will be noted that the complementary cavities 40 and 42 are concentric with each other, that is, the cavity 42 is positioned radially inside of the cavity 40, and in the same manner the cavity 46 is positioned concentric with and radially inside of the cavity 44. This makes possible the vulcanization of a tire of the size and diameter of the cavities 42 and 46 at the same time as tires of a larger bead diameter are simultaneously vulcanized in the cavities 40 and 44. It is possible to utilize more than two concentric cavities if tires of more than two sufficiently different bead diameters are to be vulcanized simultaneously.

The cavities 40 and 42 are formed by complementary cavities on the bottom of the upper mold part 12 and on the top of the intermediate mold part 14. The cavities 44 and 46 are formed and defined by complementary cavities on the bottom of the intermediate mold part 14 and on the top and the bottom mold part 16.

Each of the mold parts 12, 14 and 16 is steam jacketed. This is achieved in the manner best illustrated in Fig. 1 by drilling four holes 50, 52, 54, and 56 from front to back of each mold part, and two holes 58 and 60 from left to right of each mold part. Then by providing plugs 62, 64, 66, 68, 70, 72, 74, 76, 78, 80, 82, 84 and 86, in the manner shown in Fig. 1, an undulating or back and forth passage for steam is provided in each mold part, the steam taking the path indicated by the dotted line 88. A flexible steam line 90 is connected to the upper mold part 12, the upper mold part is connected by a flexible steam line 92 to the intermediate mold part, a flexible steam line 94 connects the intermediate mold part to the bottom mold part 16, and an exhaust steam line 96 is connected to exhaust the steam from the bottom mold part. It will thus be recognized that steam is continuously passed through the several mold parts whether they are opened or closed, and this has the very definite advantage that a very small amount of heat is lost and it is possible to noticeably reduce the curing cycle. For example, I am able to get down to curing cycles of as low as five minutes including the exchange of a vulcanized tire for a green tire in the mold.

Associated with each of the cavities 40, 42, 44, and 46, are hollow piercing needles 100, 102, 104, and 106. These piercing needles, which are exaggerated in size to permit clearer illustration in the drawing, may be built permanently into the mold cavities so that when a green tire is placed in each mold cavity the operator can press the tire over the needle to insure that the piercing needle will pierce into the inside of the tire. Or the built-in piercing needles can be positioned to pierce upon the closing of the mold. The piercing needles function when the mold is closed to supply fluid under pressure, such as air, hot water, or steam, to the interior of the tires during the vulcanizing operation, with the fluid acting to force the tire out tightly into engagement with the cavity. It is possible, as shown in Fig. 6, to employ a removable piercing needle 101 in association with the cavities, the single hollow piercing needle functioning to supply fluid under pressure to the tires T in the concentric cavities. This needle has one opening at the end of the needle and one a spaced distance up the side of the needle. The diameter of the needle has been exaggerated in Fig. 6 to better illustrate its position and structure, actually the needle is only $\frac{1}{16}$ to $\frac{3}{32}$ of an inch in diameter compared to the several inches or more diameter of the tires.

Means are provided for securing the several mold parts together in a quickly releasable manner, and this is achieved by the provision of a bolt 110 at each side of the mold, each bolt being pivotally secured at 112 to lugs formed on the bottom mold part 16. The upper mold part 12 is provided with forked lugs 114, the bolts being adapted to be swung up between the fork of the lugs 114. Each bolt 110 is flattened, as at 116, so that the bolt will slide very snugly between the legs of the lugs 114, and each bolt has a handled nut 118 screwed on its top, with the handled nut being adapted to be turned down against the lugs 114 to draw the mold parts together in tight molding relation. The top of the lugs 114 are preferably formed with a circular recess 120 which receives the lower end of the nut 118, and which may also receive a bronze washer 122 secured to the lower end of the nut 118 to provide a cushioning and lubricating action between the nut 118 and its circular seat 120. I have found that with the locking means described, I am often able to eliminate the need for any special indexing dowels between the mold parts. The tight fit of the bolts 112 and the shoulder guide provided by the circular recesses 120 for the handle nuts 118 function to effect sufficiently accurate alignment of the mold parts.

As a safety measure, I may lock each bolt 110 in the forked lugs 114 by a bar 126 which is pivotally mounted at one end to one side of the lug 114, and which is supported at its other end by a hooked stop 128. Thus, it is necessary to swing the bar 126 from its full line position shown in Fig. 3 to its dotted line position before the bolt 110 can be moved out of the forked lug 114.

The mold assembly described is provided with suitable vent openings to allow the escape of air from the mold cavities, and I provide a central opening 130 down through the center of the mold to assist in the venting action.

From the foregoing, it will be recognized that the various objects of my invention have been achieved by the provision of an improved mold for vulcanizing simultaneously a plurality of single tube tires. The mold is relatively inexpensive, is very rapid in the vulcanizing cycle, is easy to handle by the operator after a minimum of training, has many of the advantages of watch case individual tire molding without the disadvantages of the high cost and great space consumption. Heat looses are kept to a minimum, heat is applied to the mold parts immediately behind and adjacent to the molding cavities, vulcanizing efficiencies are improved and loading and unloading of the mold because of the built-in piercing pins and counter-balance arrangement is greatly facilitated.

While in accord with the patent statutes, one embodiment of the invention has been described and illustrated in detail, it is to be particularly understood that I am not to be limited thereto or thereby, but that the scope of the invention is defined in the appended claim.

I claim:

A mold for vulcanizing tires or the like including a stack of at least two registering but separable mold parts, each adjacent pair of mold parts having complementary cavities, at least a pair of screw means pivotally secured to one of the mold parts, at least several pair of spaced fingers on another of the mold parts, each screw means being adapted to be moved between a pair of spaced fingers, a nut on each screw means being adapted to be screwed down against the top of the fingers to lock the mold parts together, and a safety bar removably closing the open end of each pair of fingers to lock the screw means in operative position.

JAMES A. KARNS.

REFERENCES CITED

The following references are of record in the file of this patent:

UNITED STATES PATENTS

| Number | Name | Date |
|---|---|---|
| 551,741 | Wolcott | Dec. 17, 1895 |
| 658,472 | Seiberling | Sept. 25, 1900 |
| 1,163,987 | Eggers | Dec. 14, 1915 |
| 1,505,816 | Steele | Aug. 19, 1924 |
| 1,562,548 | Freedlander et al. | Nov. 24, 1925 |
| 1,576,061 | Pade | Mar. 9, 1926 |
| 2,004,800 | Rogers | June 11, 1935 |
| 2,028,618 | Macbeth | Jan. 21, 1936 |
| 2,029,060 | Cozzo | Jan. 28, 1936 |
| 2,113,776 | Smith | Apr. 12, 1938 |
| 2,331,630 | Rempel | Oct. 12, 1943 |
| 2,411,687 | James | Nov. 26, 1946 |

FOREIGN PATENTS

| Number | Country | Date |
|---|---|---|
| 292 of 1931 | Australia | Jan. 19, 1931 |